(12) United States Patent
Koshimae et al.

(10) Patent No.: US 7,020,171 B2
(45) Date of Patent: Mar. 28, 2006

(54) LASER OSCILLATOR

(75) Inventors: Toshiki Koshimae, Tokyo (JP); Toshiaki Watanabe, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 331 days.

(21) Appl. No.: 10/432,818

(22) PCT Filed: Mar. 28, 2002

(86) PCT No.: PCT/JP02/03086

§ 371 (c)(1),
(2), (4) Date: May 27, 2003

(87) PCT Pub. No.: WO03/067722

PCT Pub. Date: Aug. 14, 2003

(65) Prior Publication Data

US 2005/0201430 A1   Sep. 15, 2005

(30) Foreign Application Priority Data

Jan. 31, 2002   (JP) ............................ 2002-22994

(51) Int. Cl.
*H01S 3/00* (2006.01)
*H01S 3/13* (2006.01)
(52) U.S. Cl. .................... 372/38.1; 372/29.02
(58) Field of Classification Search ............. 372/38.1
See application file for complete search history.

(56) References Cited

U.S. PATENT DOCUMENTS

| 5,276,697 | A | * | 1/1994 | Davis | 372/38.07 |
| 5,844,193 | A | * | 12/1998 | Nomura et al. | 219/110 |
| 6,115,114 | A | * | 9/2000 | Berg et al. | 356/5.13 |
| 6,845,190 | B1 | * | 1/2005 | Smithwick et al. | 385/25 |
| 2004/0153175 | A1 | * | 8/2004 | Tisue | 700/56 |

FOREIGN PATENT DOCUMENTS

| CN | 1076315 A | 9/1993 |
| EP | 0 866 529 A2 | 9/1998 |
| JP | 2000-261073 | 9/2000 |

* cited by examiner

*Primary Examiner*—James Vannucci
(74) *Attorney, Agent, or Firm*—Sughrue Mion, PLLC

(57) ABSTRACT

A laser oscillator that, in accordance with a laser output instruction value or a current instruction value that is input, excites a laser medium and obtains a desired laser output comprises: reference waveform generation unit for employing the laser output instruction value or the current instruction value to generate a laser output waveform and a current waveform, which are references; a first comparison unit for obtaining, as a current monitor value, a current value used to excite the laser medium, and for comparing the current value with the current wave form generated by the reference wave form generation unit; and a second comparison unit for fetching, as a laser output monitor value, the value of a laser that is output by exciting the laser medium, and for comparing the value for the laser with the laser output waveform generated by the reference waveform generation unit, wherein an abnormality is detected.

12 Claims, 11 Drawing Sheets

LASER OSCILLATOR

TECHNICAL FIELD

The present invention relates to abnormality determination unit for detecting a failure of a laser oscillator, according to which it can be precisely determined whether an abnormality of a laser beam amplification portion or an abnormality of a portion related to a power source has occurred, and the location of the failure can be easily identified.

BACKGROUND ART

FIG. 11 is a schematic diagram showing the configuration of a laser oscillator. In FIG. 11, reference numeral 1 denotes a laser diode that emits light when a direct current is received from a power supply device 10; 2, denotes a laser medium; 3, a total reflection mirror; 4, a partial reflection mirror; 5, an expansion lens for expanding a laser beam; 6, a parallel shifting lens for changing a laser beam into parallel beams; 7, an optical fiber entrance lens; 8, an optical fiber; 9, a machine head; and 10, a power supply device.

By supplying a direct current to the laser diode 1, light is emitted, the laser medium 2 is excited, and resonance is generated between the total reflection mirror 3 and the partial reflection mirror 4. As a result, a laser beam is obtained.

The thus obtained laser beam is expanded by the expansion lens 5 and is changed into parallel beams by the parallel shifting lens 6, and the obtained beams are concentrated at the end face of the optical fiber 8 by the optical fiber entrance lens 7. Then, the concentrated laser beam passes through to the inside of the optical fiber 8 and is guided to a predetermined location through the machine head 9.

The laser output can be adjusted by varying the current supplied to the laser diode 1. Generally, a predetermined laser output or a current instruction is externally transmitted to the power supply device 10 that supplies current to the laser diode 1, and the power supply device 10 then controls the current that is to be supplied to the laser diode 1.

FIG. 12 is a diagram showing a specific internal example for the power supply device 10. First, the basic operation of the power supply device 10 will be described.

In the power supply device 10, input power is transformed into a direct current by a rectifier 16, and the direct current charges a capacitor 17.

Then, a transistor 13 is turned on, and a current begins to flow to the laser diode 1 through a reactor 14.

The amount of current flowing to the laser diode 1 is increased while the transistor 13 is on, and when the amount of the current exceeds a desired current value, the transistor 13 is turned off to decrease the current.

When the amount of the current falls below the desired current value, the transistor 13 is turned on to increase the current.

By repeating the turning on and off of the transistor 13, the amount of current is adjusted to obtain the desired current value.

An example on and off control process is, as is shown in FIG. 13, a hysteresis comparator control process wherein the ON and OFF states are controlled within a range extending from the upper to the lower limit current values that are provided, or a PWM control process wherein the ON time is controlled during a specific period of time.

The control process will now be described in detail while referring to FIG. 12.

A current controller 18 fetches a desired current value (current instruction value), and the value of a current that is obtained through a current sensor 12, that is appropriately controlled by a gain adjustment unit 20, and that is currently flowing.

In the hysteresis comparator control process, these two types of data are fetched by a comparator 21, and the comparator 21 compares the data with a current value for turning on the transistor 13 and a current value for turning off the transistor 13, both of which are set in advance, and determines whether the transistor 13 should be turned on or off.

Though not shown in FIG. 12, in the PWM control process a difference between the two types of data is calculated by a microcomputer, and the ON time is controlled within a specific period of time.

The thus obtained ON or OFF instruction of the transistor 13 is transmitted to a circuit for driving the transistor 13 (a circuit that, based on a logic signal received from a control system, supplies the current or the voltage actually required to turn the transistor 13 on or off). As a result, the transistor 13 is turned on or off.

Through these operations, the power controller 18 fetches a desired current value, and adjusts the current to match the desired current value.

The control process for obtaining a desired laser output value will now be described.

The power controller 18 fetches a desired laser output instruction value and a laser output monitor value (current laser output) that is transmitted through a laser output monitor sensor 11.

The power controller 18 calculates a difference between the obtained data, and adjusts a presently available current instruction value.

Based on the adjusted current instruction value, the transistor 13 is turned on or off in the same manner as when an externally supplied, desired current value is received.

A switch 19 is a selection switch used to validate a current instruction or a laser output instruction.

A solid-state laser oscillator, which is controlled as described above, is used for welding or cutting metal.

When a desired laser output can not be maintained, a welding failure or a cutting failure occurs. Thus, means is required for providing an external alarm warning that an abnormality has occurred when the desired laser output can not be maintained.

As example means for providing an external alarm when an abnormality has occurred and the desired laser output can not be obtained, for a minimum required laser output of 200 W, a circuit 25 is additionally provided that is turned on when the laser output monitor value reaches 200 W, and that transmits an ON signal to an oscillator controller 26. Further, awaiting period for the ON signal is defined, and when the signal is not rendered on within the allocated period of time, an abnormality notification is provided.

Further, in an example wherein an upper laser output limit is defined to prevent too much welding power, a maximum 300 W is set as the upper limit value, and a circuit 24 is additionally provided that is turned on when the laser output exceeds the upper limit. Using this ON signal, an abnormality notification can be provided.

In addition, a maximum available current is defined for the laser diode 1, and when a current equal to or greater than the defined value is supplied, an abnormality occurrence notification must be given externally.

When, for example, the laser diode 1 will be damaged when a current of 50 A or greater is supplied, a circuit 23 is additionally provided that is turned on when the current monitor value obtained by the current sensor 11 is greater than 50 A. This ON signal is transmitted to the oscillator controller 26 as an abnormality notification.

Based on this ON signal, the oscillator controller 26 performs an appropriate process (e.g., a power cutoff) and protects the laser diode 1.

An example arrangement for protecting the laser diode 1 has been explained. However, when the value of a current that can flow to another device, such as the transistor 13 or the reactor 14, is lower than the available value of a current flowing to the laser diode 1, the defined current value must be changed in accordance with the other device.

As is described above, since the solid-state laser oscillator has means for providing an external notification for a laser output abnormality, a welding or cutting failure can be prevented.

Furthermore, when a current flows that is equal to or greater than a defined value, the means for providing an external notification of an abnormality protects the individual devices.

When both an abnormality resulting from the laser output exceeding an upper limit and an abnormality resulting from a current value exceeding a defined value occur at the same time, the above described conventional solid-state laser oscillator can determine whether too much current has been supplied to the laser diode 1, and can also determine whether the laser output exceeded the upper limit because of the power supply abnormality.

A power supply abnormality is an abnormality other than one for the light amplification portion (damage to a PR mirror or a TR mirror) excluding the laser diode 1 in FIG. 1. An example abnormality is the failure of a device used to supply power.

However, merely by providing notification that an abnormality has resulted from the laser output exceeding an upper limit (an abnormality resulting from a current value exceeding a defined value has not occurred), whether there is a power supply abnormality can not be determined.

While referring to FIG. 12, an explanation will now be given for an example laser oscillator wherein the lower output limit value is 200 W, the upper limit value is 300 W, and the maximum defined current value is 50 A; wherein a laser output of 250 W is obtained when a current of 20 A is supplied, and a laser output of 350 W is obtained when a current of 40 A is supplied; and wherein a desired current instruction value is 20 A.

When 0.5 times an actual current value is returned to the comparator 21, as the current monitor value obtained by the current sensor 11, because an abnormality has occurred at the gain adjustment unit 20, (1/0.5) times a current, i.e., 40 A, is actually supplied to the laser diode 1, while a current of 20 A was originally transmitted to the laser diode 1. Therefore, a 350 W laser is output.

Thus, conventionally, it can be determined that an abnormality has occurred wherein the laser output exceeds the upper limit. At this time, since the current actually flowing across the laser diode 1 is 40 A, which is equal to or lower than the maximum defined current value, an abnormality that occurs when the current value exceeds the defined value is not detected.

Generally, an abnormality in a light amplification portion is assumed to be an abnormality that occurs when the laser output exceeds the upper limit. In this case, however, it should be determined that an abnormality has occurred, not at the light amplification portion but at the gain adjustment unit 20 of the current controller 18, i.e., that a power supply abnormality has occurred. This abnormality can not be precisely detected.

In addition, when wiring extended to the laser diode 1 is cut off, a current does not flow to the laser diode 1, and accordingly, no laser is output.

Therefore, the laser output is reduced, to below the lower limit, and a laser output abnormality occurs.

At this time, since a current does not flow across the laser diode 1, an abnormality resulting from the current value exceeding the defined value does not occur.

Also in this case, it should be determined that the abnormality has not occurred at the light amplification portion, but that the abnormality, i.e., a power cutoff, has occurred at the power supply portion. However, the power supply abnormality can not be designated merely by detecting the laser output abnormality.

This is because, since the detection of the power supply abnormality is performed in order to protect the power supply body (to protect devices such as the laser diode 1 and the transistor 13), a power supply abnormality that would cause a welding failure or a cutting failure is detected as the laser output abnormality.

That is, the conventional laser oscillator can detect the laser output abnormality to prevent the occurrence of a welding failure or cutting failure. However, whether the abnormality has occurred at the light amplification portion or the power supply portion can not be determined, for it is difficult to identify the location of the abnormality, and to cope with the abnormality, an extended period of time is required.

DISCLOSURE OF THE INVENTION

To resolve these problems, it is one objective to provide an apparatus that can prevent a welding failure or a cutting failure, and that can easily identify the location of the failure.

To achieve this objective, according to a first aspect of the invention, a laser oscillator that, in accordance with a laser output instruction or a current instruction value that is input, excites a laser medium and obtains a desired laser output comprises:

reference waveform generation unit for employing the laser output instruction value or the current instruction value to generate a laser output waveform and a current waveform, which are references;

a first comparison unit for obtaining, as a current monitor value, a current value used to excite the laser medium, and for comparing the current value with the current waveform generated by the reference waveform generation unit; and a second comparison unit for fetching, as a laser output monitor value, the value of a laser that is output by exciting the laser medium, and for comparing the value for the laser with the laser output waveform generated by the reference waveform generation unit, wherein an abnormality is detected.

The laser oscillator further comprises:

a third comparison unit for fetching an ON/OFF signal for a main circuit device for controlling a current that flows across a laser diode that excites the laser medium or a monitor signal for the main circuit device, and for comparing the ON/OFF signal with an ON/OFF signal for the main circuit device that is generated by the reference waveform generation unit based on the laser output instruction or the current instruction value.

Furthermore, for the comparison performed by the comparison unit, a predetermined permissible range is set for a reference waveform.

BEST MODES FOR CARRYING OUT THE INVENTION

First Embodiment

Figure 1:
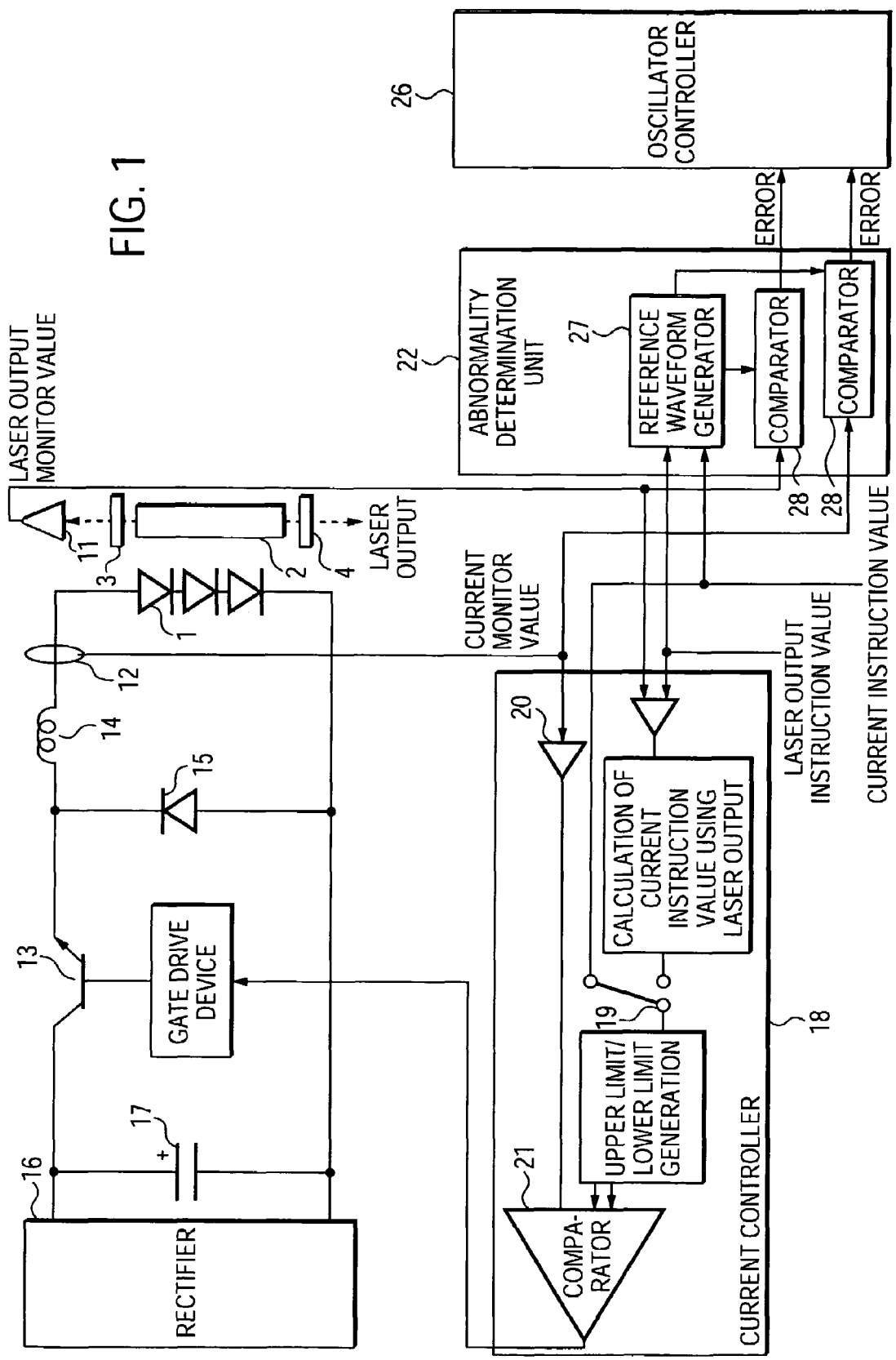
FIG. 1 is a schematic diagram showing the configuration of a laser oscillator according to a first embodiment of the invention.

FIG. 1 is a diagram showing the configuration of a laser oscillator according to a first embodiment of the present invention.

First, the basic operation of a power supply device 10 will be described.

In the power supply device 10, the power that is input is transformed into a direct current by a rectifier 16, and the direct current is used to charge to a capacitor 17.

A transistor 13 is turned on, and a current begins to flow through a reactor 14 to a laser diode 1.

Thereafter, the current flowing across the laser diode 1 is increased during a period wherein the transistor 13 is on, and when the strength of the current exceeds a desired current value, the transistor 13 is turned off to decrease the current.

When the current strength falls below the desired current value, the transistor 13 is turned on to increase the current.

By repeating the turning on and off of the transistor 13, the current strength is adjusted to the desired current value.

Figure 13:
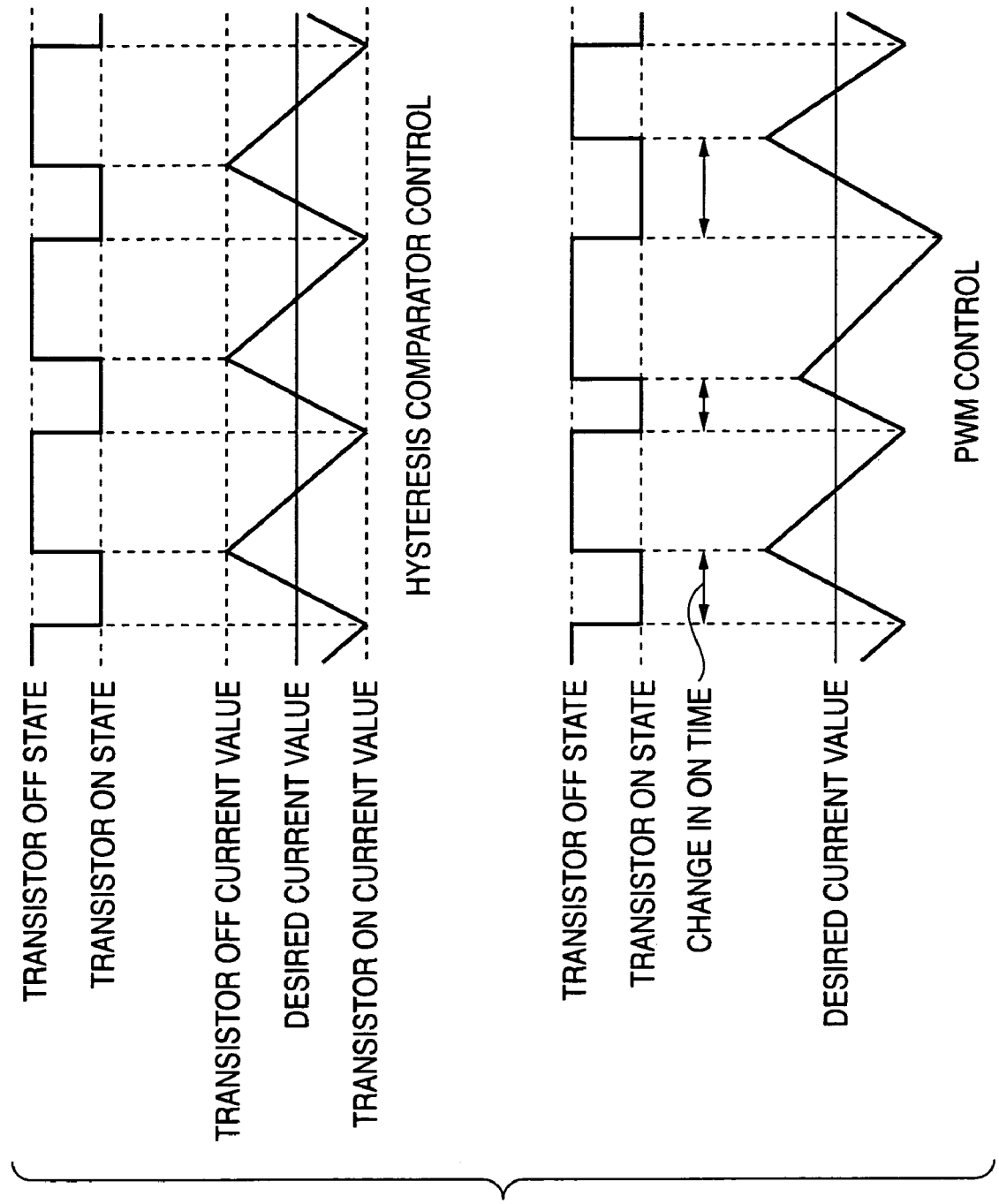
FIG. 13 is a diagram for explaining hysteresis comparator control and PWM control.

The ON/OFF timing control, as is shown in FIG. 13, explained for the conventional example, can be a hysteresis comparator control process wherein the transistor 13 is turned on or off within a range extending from the upper limit to the lower limit provided for the current value, or the PWM control process wherein the ON time is controlled within a specific, limited time period.

The control process will now be described in detail while referring to FIG. 1.

A power controller 18 fetches a desired current value (current instruction value) and the value of the current that is currently flowing, and is appropriately controlled through a current sensor 12 by a gain adjustment unit 20.

During the hysteresis comparator control process, the two types of data are fetched to a comparator 20. The comparator 20, then compares the data with current values, which have been set in advance, for turning on the transistor 13 and for turning off the transistor 13, and determines whether the transistor 13 should be turned on or off.

Whereas although not shown, in the PWM control process a difference between the two types of data thus fetched is calculated by a microcomputer, and the ON time is increased or reduced during a specified time period.

The operation of an abnormality determination unit 22, which is the feature of the embodiment, will now be described.

A conventional abnormality determination unit determines that an abnormality has occurred by comparing a current control value, an upper laser output limit value and a lower laser output limit value, all of which have been set in advance, with a current monitor value and a laser output monitor value that have been obtained. In this embodiment, the abnormality determination unit obtains a current instruction value and a laser output instruction value, and compares them with a current monitor value and a laser output monitor value that have been obtained.

Figure 2:
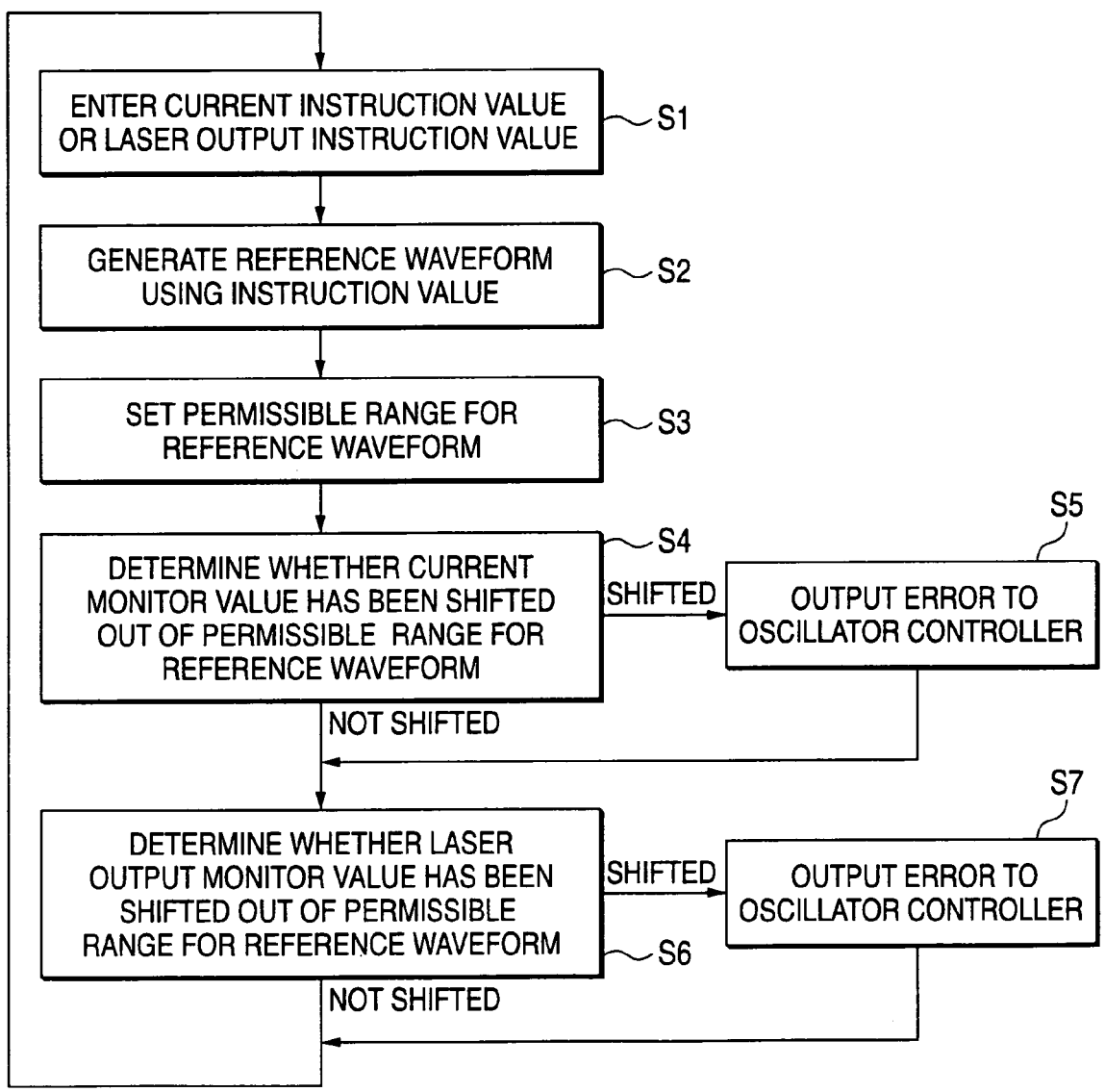
FIG. 2 is a flowchart showing the abnormality determination processing.

FIG. 2 is a flowchart showing the abnormality determination processing performed by the abnormality determination unit. The schematic abnormality determination operation will now be explained while referring to the flowchart in FIG. 2.

At step S1, either the current instruction value or the laser output instruction value are entered. It should be noted that, in this case, either only the current instruction value or the laser output instruction value need be entered. At step S2, either a current waveform or a laser output waveform is generated as a reference consonant with the instruction value (hereinafter the current or laser output waveform, which is a reference consonant with the instruction value, is called either a reference current waveform or a reference laser output waveform).

At step S3, the reference waveforms are employed to set a permitted range even when the actual current, which is a current monitor value detected by a current sensor 12, and a laser output, which is the laser output monitor value input through a laser output monitor sensor 11, differ from the instruction values.

At step S4, a comparator 28, which is a first comparison unit, compares the current monitor value with the permissible range, and when the current monitor value exceeds the permissible range, the existence of an abnormality is determined at step S5, and an error signal is output to the oscillator controller 26.

At step S6, a comparator 29, which is a second comparison unit, compares the laser output monitor value with the permissible range, and when the laser output monitor value exceeds the permissible range, the existence of an abnormality is determined at step S7 and an error signal is output to the oscillator controller 26.

The operation performed at steps S1 through S7 is repeated to monitor the solid-state laser oscillator.

An explanation will now be given for an example wherein the current instruction value and the laser output instruction value are employed to generate the reference current waveform and the reference laser output waveform.

First, an explanation will be given for the generation of the reference current wave form using the current instruction.

In FIG. 1, when the transistor 13 is on, the reference current waveform is a rising waveform determined by the characteristics of the reactor 14 and the laser diode 1, which serves as a load.

Figure 3:
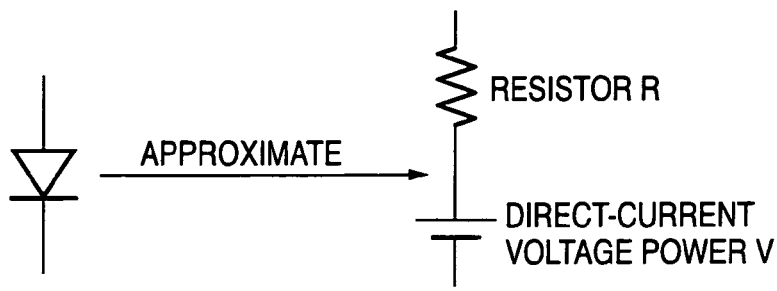
FIG. 3 is a diagram for explaining an equivalent circuit in a laser diode.
Figure 4:
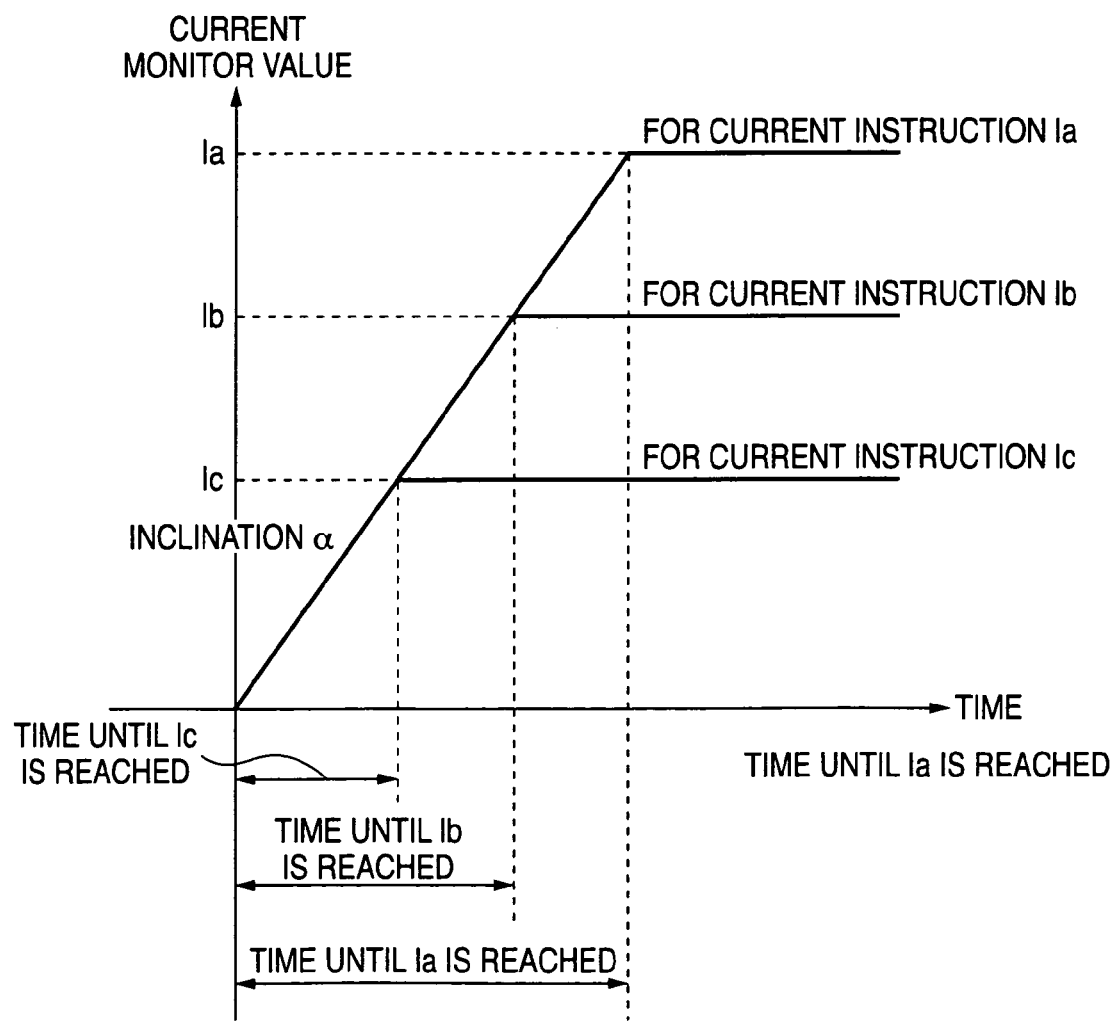
FIG. 4 is a diagram showing a current waveform.

Since, as is shown in FIG. 3, the characteristic of the laser diode 1 can be approximated using a resistor R and a direct-current voltage source V, the current value is substantially increased linearly, as is shown in FIG. 4.

When the inductance value of the reactor 14 is denoted by L1 and the approximate resistance of the laser diode 1 is denoted by R1, the inclination of the current, depicted by a rising waveform, is determined to be a constant $\alpha$, in accordance with the value (R1/L1). Since this constant $\alpha$ is a persistent value when the characteristics of the reactor 14 and the laser diode 1 are not changed, by employing the following equation, the rising waveform of the current can be represented using $\alpha$, so long as the characteristics are unchanged:

$$current I = inclination \alpha \times time\ t.$$

Since the constant $\alpha$ is a persistent value, regardless of the current instruction value, the time required for the current value to attain a desired value differs, depending on the current instruction value.

When the current instruction value is denoted by I1, the period required for the current value to reach I1 is represented by (I1/$\alpha$).

Therefore, the current can be represented by the following functions:

$$I = \alpha \times t \text{ when } 0 \leq t \leq (I1/\alpha) \quad \text{Equation 1}$$

$$I = I1 \text{ when } (I1/\alpha) \leq t \quad \text{Equation 2}$$

Since the current is represented by the functions, this current can be used as the reference current waveform.

It should be noted that the characteristic of the laser diode 1 can be approximately represented by employing a comparatively simple function that uses the resistance and the power voltage. However, some characteristics of the laser diode 1 can not be represented simply by using the resistance and the power voltage. For this, the current waveform must be actually measured and the function of an approximate curve must be obtained and used as the reference current waveform.

Figure 5:
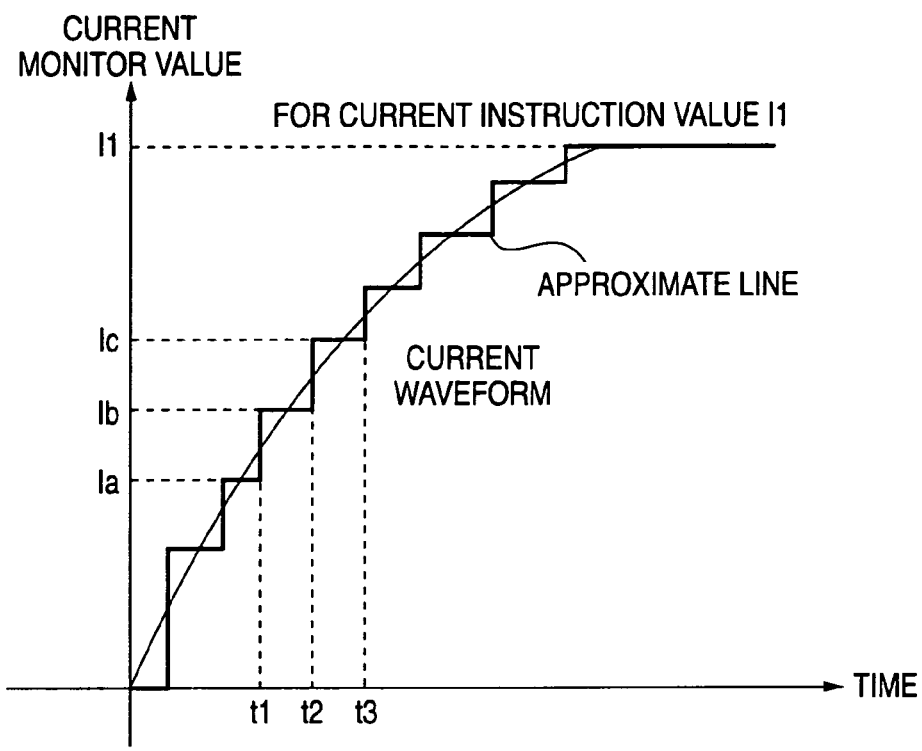
FIG. 5 is a graph showing an approximation of the current waveform.
Figure 5:
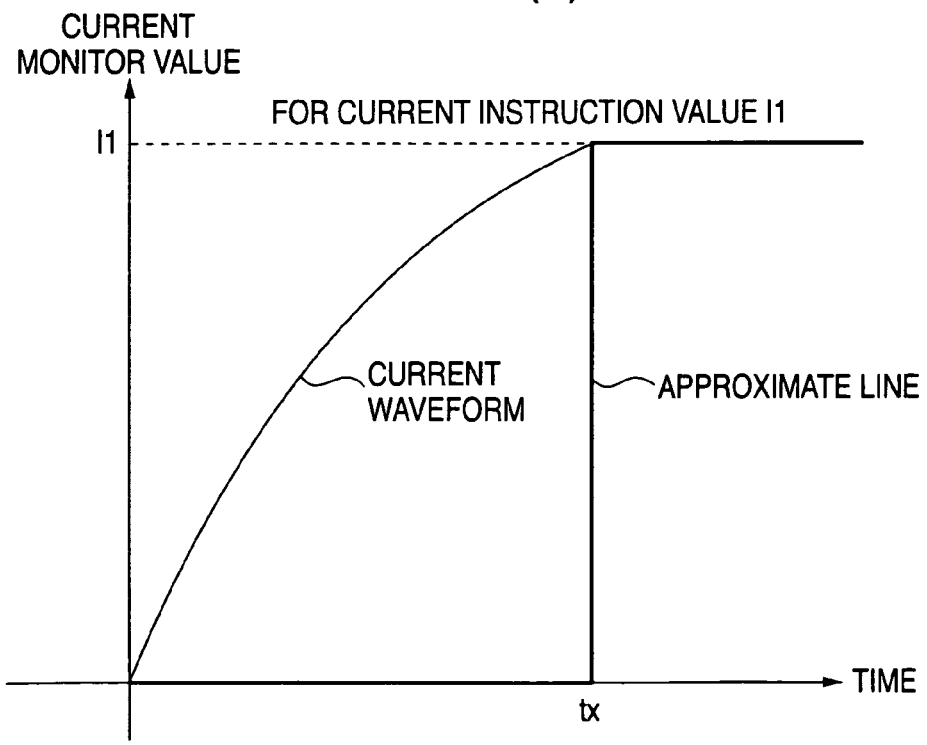

Another method, as is shown in FIG. 5, is a method for performing a stepped approximation of an actual current waveform. According to the stepped approximation method, the current value between time t1 and time t2 is adjusted so it approximates that of Ia, and the current value between the time t2 and time t3 is adjusted so it approximates that of Ib.

An extreme approximation example is shown in FIG. 5b, wherein the current value is defined as 0 from time t0 to time tx, whereat a desired current value I1 is obtained, and the current value following time tx is defined as the desired current value.

In this manner, the reference current waveform can be generated in accordance with the current instruction.

An explanation will now be given for an example wherein the reference laser waveform that is output is generated in accordance with the current instruction.

In this case, the function of the relationship between the current value and the laser output can be obtained by substituting this function into the above function for the reference current waveform.

Since the laser output is increased in proportion to the increase in the current when a threshold current (the minimum current amount required for laser oscillation) is exceeded, the relationship between the current I and a laser output P can be represented as $$P = \beta \times (I - \gamma) \quad \text{Equation 3}$$

wherein $\beta$ denotes a proportional constant and $\gamma$ denotes a threshold current.

When the reference current waveform is represented by the functions of equations 1 and 2, the laser output can be represented by the following functions:

$$P = \beta \times (\alpha \times t - \gamma) \text{ when } 0 \leq t \leq (I1/\alpha) \quad \text{Equation 4}$$

$$P = \beta \times (I1 - \gamma) \text{ when } (I1/\alpha) \leq t \quad \text{Equation 5}$$

Since the laser output is represented by these functions, the values can be used for the reference laser waveform that is output.

When the relationship between the current value and the laser output can not simply be represented as in equation 3, the laser output waveform must actually be measured, and the function for the approximate curve must be obtained for use as the reference laser output waveform.

While the stepped approximation is performed to obtain the reference current waveform in accordance with the current instruction value, the reference laser output waveform can also be obtained, in the same manner, by the stepped approximation.

An explanation will now be given for an example wherein the reference current waveform is generated in accordance with the laser output instruction.

The current amount is continuously increased until the laser output monitor value reaches the laser output instruction value. When the laser output instruction value is reached, the current is set to a constant value.

When the current value, which is the laser output instruction value P1, is denoted by Ip1, the waveform for this current is obtained by replacing the current instruction value I1 with Ip1 to acquire the reference current waveform.

For example, when the current instruction value, the actual current value and the laser output value are represented by equations 1, 2 and 3, based on equation 3, the current value I1p, which is the laser output instruction value P1, is represented as follows:

$$Ip1 = (P1/\beta) + \gamma \quad \text{Equation 6}$$

Therefore, from equations 1 and 2, $$I = \alpha \times t \text{ when } 0 \leq t \leq (((P1/\beta) + \gamma)/\alpha) \quad \text{Equation 7}$$

$$I = (P1/\beta) + \gamma \text{ when } (((P1/\beta) + \gamma)/\alpha) \geq t \quad \text{Equation 8}$$

Since the current is represented by these functions, an obtained value can be used as the reference current waveform.

While the reference current waveform and the reference laser output waveform have been obtained in accordance with the current instruction value, the current waveform may be actually measured and the function for the approximate curve may be obtained for use as the reference current waveform, or the stepped approximation may be performed and the obtained waveform may be used as the reference current waveform.

Next, an explanation will be given for an example for generating a reference laser output waveform in accordance with a laser output instruction.

As is described in the example for generating, in accordance with a current instruction, the reference laser output waveform, the reference laser waveform that is output, can be obtained by substituting the function representing the relationship, between the current value and the laser output value, into the function representing the reference current waveform.

For example, when the reference current waveform is represented by equations 7 and 8, based on equation 3, $P=\beta \times (\alpha \times t-\gamma)$ when $0 \leq t \leq (((P1/\beta)+\gamma/\alpha)$     Equation 9

$P=P1$ when $(((P1/\beta)+\gamma)/\alpha) \leq t$     Equation 10

Since the laser output can be represented by using the function, it can be used as a reference laser output waveform.

Naturally, the laser output waveform may actually be measured and the function for an approximate curve may be obtained for use as a reference laser output waveform, or the stepped approximation process may be performed and the results may be used as the reference laser output waveform.

In the above examples, a constant value has been set upon the rise of the current and the output of the laser. For a case wherein it falls, the reference waveform can be generated in the same manner. When a current instruction or a laser output instruction is not issued, i.e., when a current value of 0 A or a laser output of 0 W is instructed, naturally, the reference waveform for the current value of 0 A or the laser output of 0 W can be generated.

A permissible range must be set to cope with a case wherein the actual, current monitor value and the laser output monitor value differ from the reference current waveform and the thus obtained reference laser output waveform.

This range should be set because, since a variance is present in the characteristics of the laser diode 1, which serves as a load, and the reactor 14, the actual waveforms may differ from the reference waveforms.

To determine the permissible range, the following points must be taken into account:

1. a variance in the inclination of a current due to a variance in the characteristics of the reactor and the laser diode, 2. parallel shifting of a current value due to the offset shifting of a current sensor (although a current value 0 A is actually output, the signal for a sensor is output as if a 1 A current was flowing)

3. variances in the maximum current value and the minimum current value produced by turning on and off the transistor (a difference between the ON current value and the OFF current value of the transistor in FIG. 13) The permissible range can be determined through a discussion of the above entries. While a specific value for this range will not be described in detail because, depending on the power supply device, it will differ, a method for setting the permissible range will be explained.

Since the same method is employed both for the reference current waveform and the reference laser output waveform, an explanation will be given only for the reference current waveform.

Whether an abnormality has occurred is determined after the permissible range has been set. For this abnormality determination, a distance is measured whereat a monitor value is shifted from the reference waveform at a specific time.

Or a difference between the time whereat a specific reference current is reached and the reference value is measured to determine whether an abnormality has occurred. The two methods described above can be employed and a permissible range set in different manners.

Figure 6:
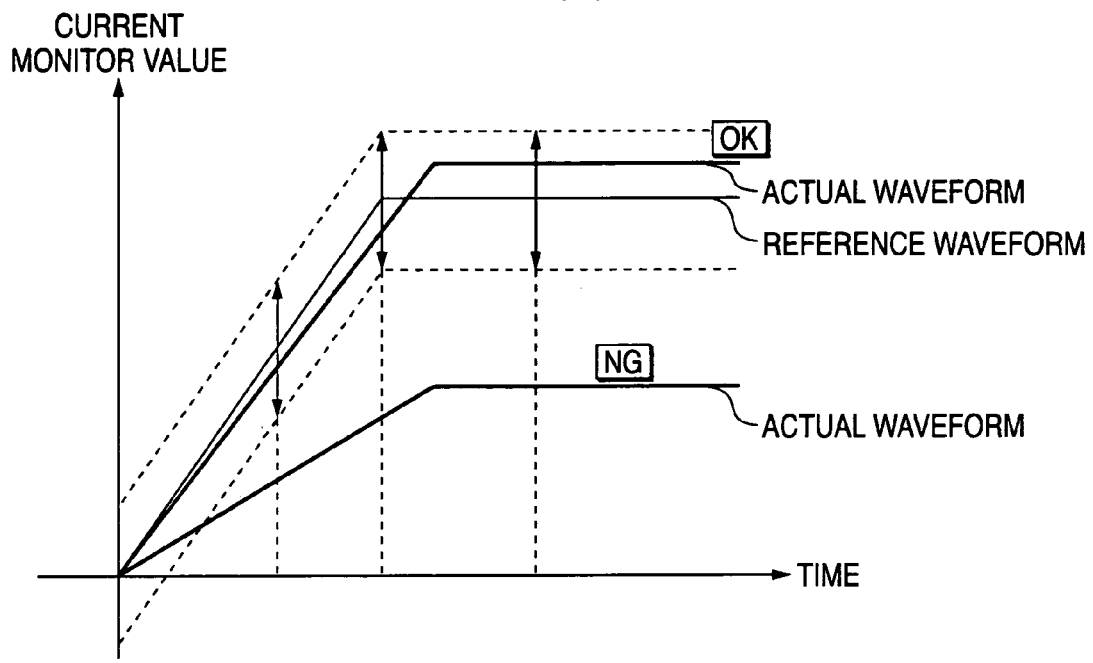
FIG. 6 is a graph showing an abnormality determination sequence.
Figure 6:
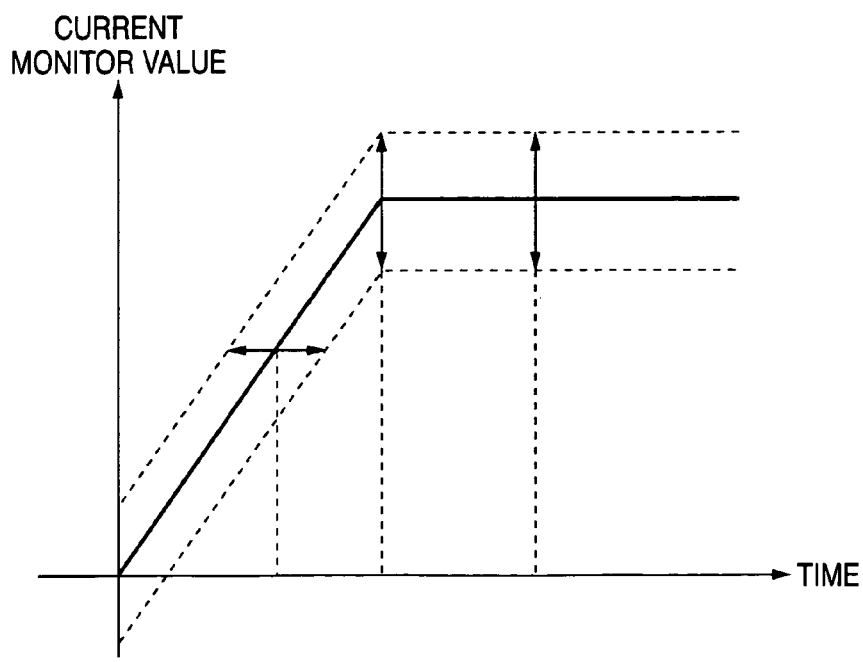

Therefore, to measure a difference between the monitor value at a specific time and the reference value, maximum and minimum monitor values permitted at the specific time must be set, as is shown in FIG. 6a.

As is shown in FIG. 6b, to measure a difference between the time whereat a specific reference current is reached and the reference time value, the width must be set for the time whereat the reference current is reached, as shown in FIG. 6b.

In this case, after a constant current has been reached, the determination process must be changed to a process for determining a difference between a monitor value at a specific time and the reference value.

The permissible ranges need not always be constant values, and may be varied in correlation with the current instruction value and the laser output instruction value, or they may be changed as time elapses.

After the permissible ranges have been set, these ranges are compared with the current monitor value and the laser output monitor value.

During this comparison process, as is described above, difference between the monitor value at a specific time and the reference value, or a difference between the time whereat a specific reference current is reached and the reference time value is measured, and when the difference falls outside the reference range, it is determined that an abnormality has occurred. An error signal is then output to the oscillator controller 26.

The comparison timing may be monitored constantly, or may, under the control of a microcomputer, be monitored at regular intervals to determine whether the difference in time falls outside the reference range.

Since in many cases cutting or welding is performed when a constant laser output is obtained, the comparison process may not be performed before the current or the laser output becomes constant, and may be started after it becomes constant.

In this embodiment, through the above described operation, whether the monitor value falls outside the reference waveform is detected, and a welding failure or a cutting failure is prevented. Further, when a laser output abnormality has occurred, it can be precisely determined whether the abnormality is related to the light amplification portion or to the power supply portion, and the location of the failure can be easily identified.

An explanation will now be given for an example performed under the same conditions as those used for the explanation given for the conventional example, i.e., wherein the lower limit and the upper limit of the output control value are respectively 200 W and 300 W and the maximum defined current value is 50 A, wherein a laser output of 250 W is obtained by supplying a current of 20 A and a laser output of 350 W is obtained by supplying a current of 40 A, and wherein a desired current instruction value is 20 A.

When the occurrence of an abnormality at the gain adjustment amplifier 20 is detected in accordance with the current monitor value output by the current sensor 11, and when 0.5 times the actual current value is originally returned to the comparator 21, a current of 20 A is supposed to flow to the laser diode 1. However, actually, (1/0.5) times the current, i.e., 40 A, is supplied to the laser diode 1, and a laser is output at 300 W. Thus, it can be determined that there is a laser output abnormality.

In the conventional example a power supply abnormality does not occur. In this invention, however, when it is set up so that an abnormality is detected when there is a difference of at least 3 A, for example, from the reference waveform, since an actual current of 40 A differs from the reference waveform of 20 A by more than 3 A, it can be determined that there is a power supply abnormality.

That is, although no abnormality is detected for the light amplification portion, an abnormality has occurred for the gain adjustment amplifier 20 of the current controller 18, and it can be correctly determined that the abnormality is related to the power supply portion.

On the other hand, when the power on the line to the laser diode 1 is cut off, the laser output value is lower than the lower limit of the control value, and a laser output abnormality occurs. And in addition, since there is no current flow, the waveform differs from the reference waveform, thereby indicating that a power supply abnormality has also occurred.

Therefore, it can be determined that the laser output abnormality occurred due to the power supply abnormality.

Assume that a power abnormality has not occurred, even though there is a laser output abnormality. According to the conventional example, since the waveform of the current that is actually flowing is not compared with the reference waveform, whether or not the current is being correctly supplied to the laser diode 1 (is flowing in accordance with the reference waveform) can not be determined, and accordingly, a decision can not be made as to whether no abnormality has occurred in the power supply portion.

According to the invention, however, since the waveform of the current that is actually flowing is compared with the reference waveform, it is apparent that the current is being correctly supplied to the laser diode 1 (is flowing in accordance with the reference waveform), and it can be determined that an abnormality has occurred at the light amplification portion, and that no abnormality has occurred at the power supply portion.

Furthermore, since the laser output is constantly monitored to detect any abnormality, a cutting failure or a welding failure does not occur.

As is described above, as the feature of the invention, the current monitor value, which is detected through the current sensor 12, and the laser output monitor value, which is received through the laser output monitor sensor 11, are compared with the reference current waveform and the reference laser output waveform, which are obtained in accordance with a current instruction value and a laser output instruction value that are externally input and received. When the monitor values differ, an individual operating the laser is notified an abnormality has occurred. Therefore, a cutting failure and a welding failure are prevented, and when a laser output abnormality has occurred, it can be precisely determined whether the abnormality has occurred at the light amplification portion or at the power supply portion. As a result, the location of the failure can be easily identified.

Second Embodiment

Figure 7:
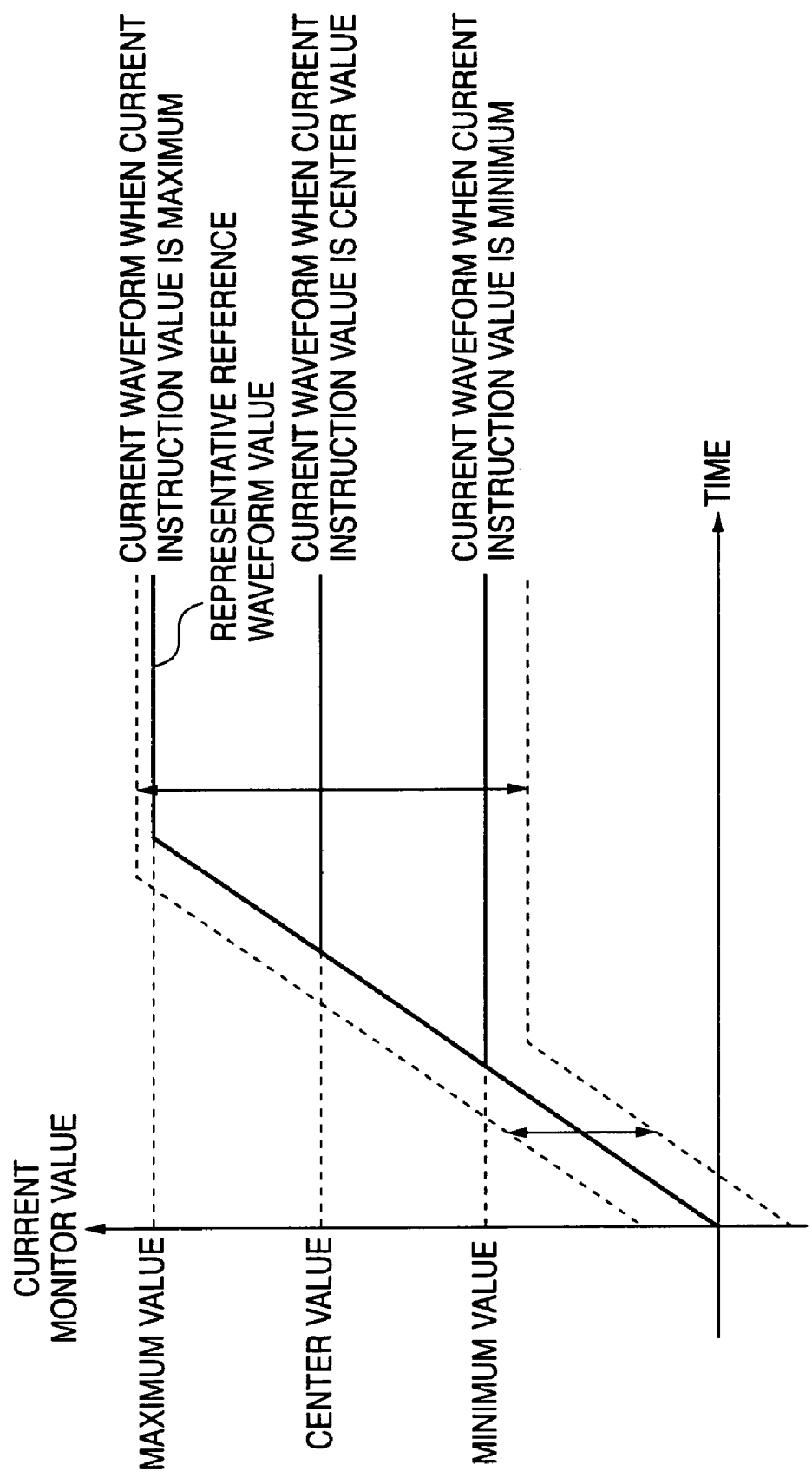
FIG. 7 is a graph showing a permissible range set for a second embodiment.

According to a second embodiment, the method used for setting a reference waveform differs from that for the first embodiment, as is shown in FIG. 7.

In the first embodiment, different reference waveforms are generated based on the current instruction value and the laser output instruction value, while in the second embodiment, reference waveforms are generated based on the representative values of the current instruction value and the laser output instruction value.

As a representative value, either the maximum value for the current instruction or the laser output instruction, or a center value may be employed.

By using the representative value for the reference waveform, a permissible range can be set while taking into account not only variances produced by the components of a power source, but also a change in the current monitor value or the laser output value when the current instruction or the laser output instruction differs.

Further, as another method for generating a reference waveform, the minimum and maximum current instruction values may be employed to set the reference waveform and to set a predetermined permissible range. As a result, the same effects can be obtained as are obtained in the first embodiment.

Third Embodiment

Figure 8:
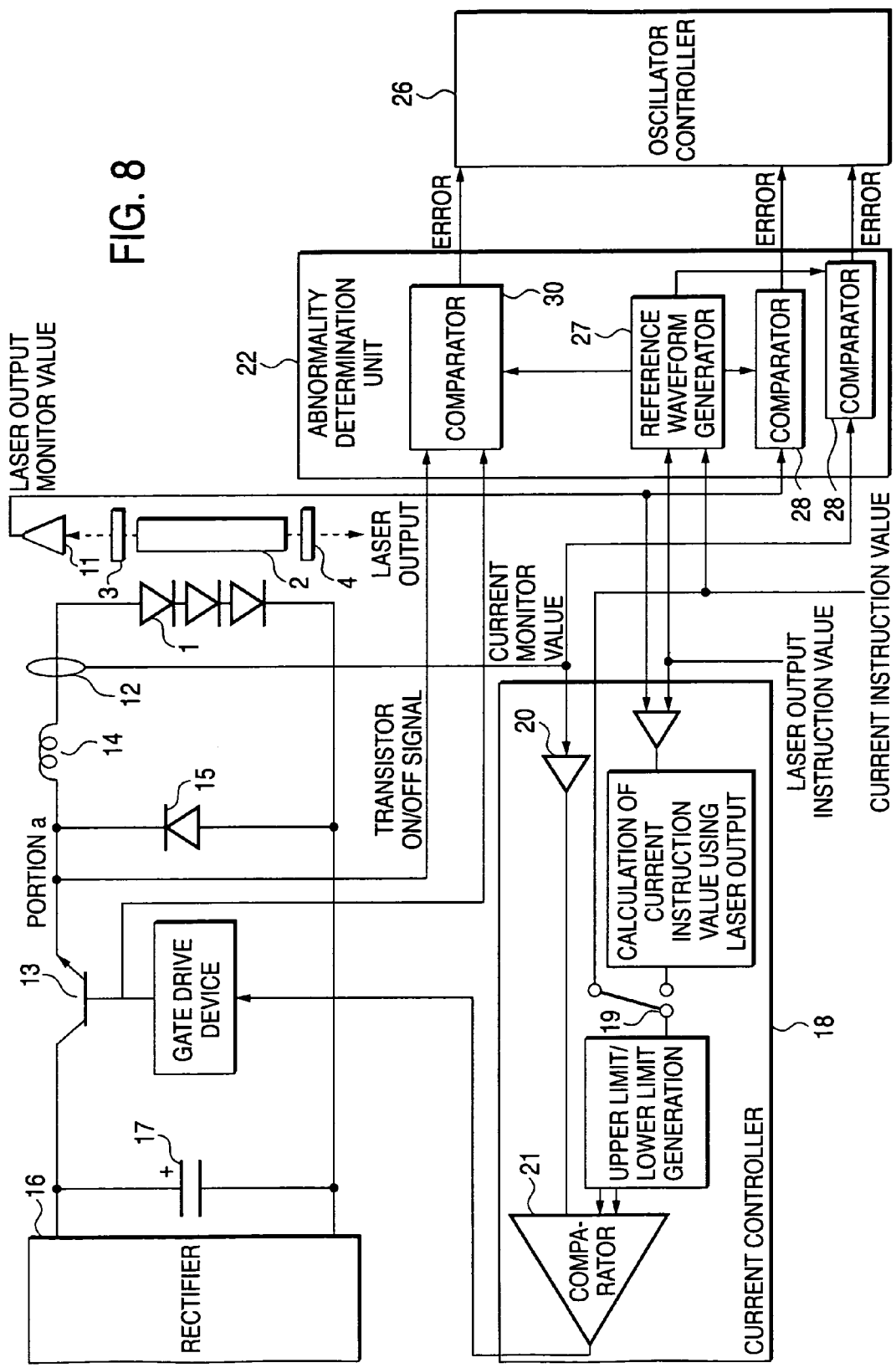
FIG. 8 is a schematic diagram showing the configuration of a laser oscillator according to a third embodiment.

According to a third embodiment, in addition to the configuration of the first embodiment, an ON/OFF signal for the transistor 13 is transmitted to a comparator 30 that corresponds to the third comparison unit of the abnormality determination unit 22 (FIG. 8).

The ON/OFF signal for the transistor 13 is used when measuring a voltage change in the gate drive device of the transistor 13.

As another method, a potential difference between the collector voltage for the transistor and the negative electrode potential of the capacitor is measured (portion a in FIG. 8). When the difference is the same as the positive potential of the capacitor, it can be assumed that the transistor is in the ON state, and when the difference is the same as the negative potential of the capacitor, it can be assumed that the transistor is in the OFF state. Thus, the voltage change may be employed as an ON/OFF signal for the transistor.

In this embodiment, the ON/OFF signal for the transistor can be monitored in the described manner.

Also, for an ON/OFF signal for the transistor, a reference transistor ON/OFF waveform is generated in accordance with a current instruction value or a laser output instruction value.

Figure 9:
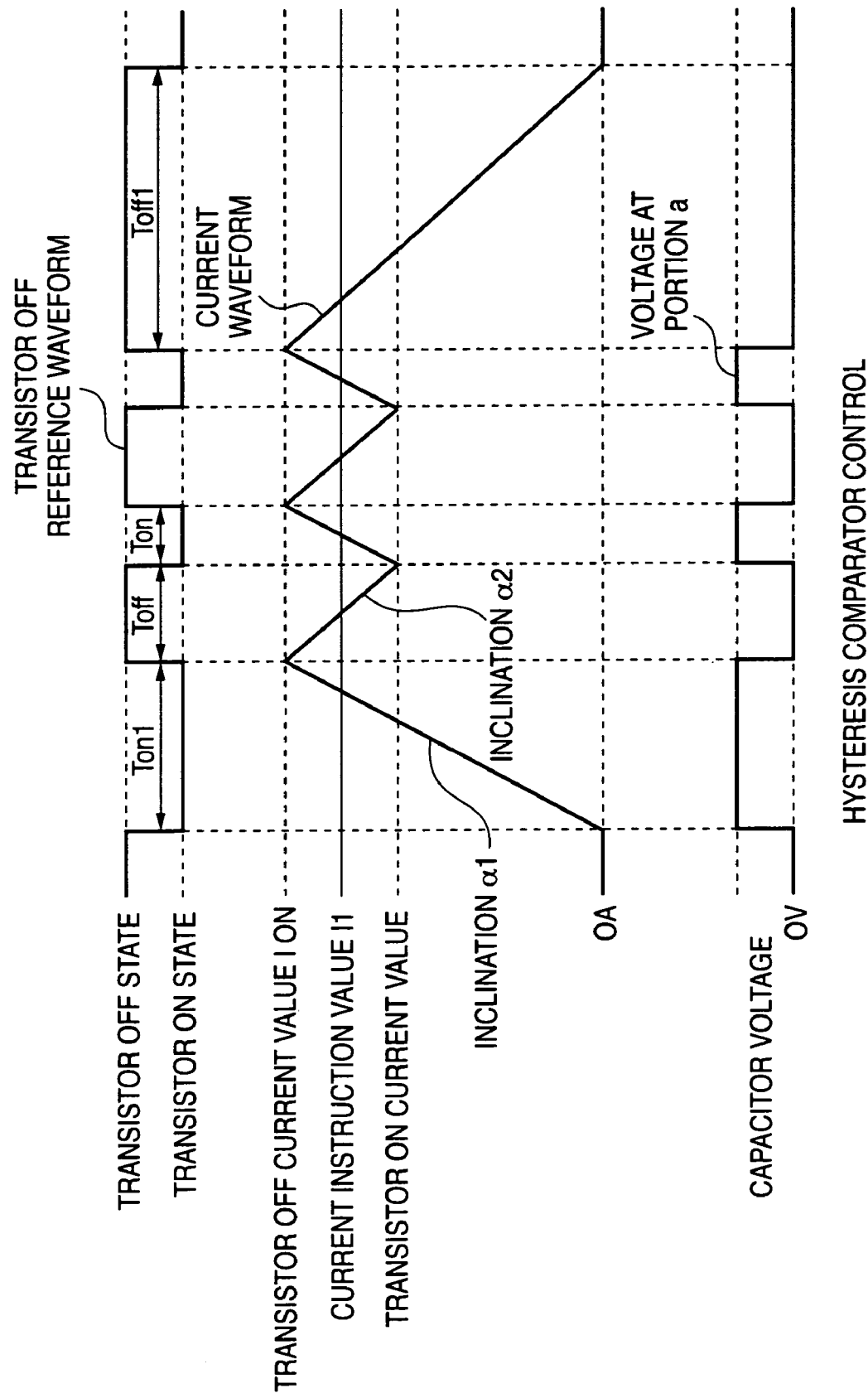
FIG. 9 is a diagram showing the determination performed for the ON/OFF waveform of a transistor.

As a method for generating the reference transistor ON/OFF waveform, an explanation will now be given for an example wherein the ON/OFF state of the transistor is defined in accordance with a specific current value in the hysteresis comparator control process shown in FIG. 9.

At this time, the inclination when the current is increased is a constant $\alpha 1$, which is determined using the value (R1/L1), and the inclination when the current is reduced is a constant $\alpha 2$, which is also determined using the value (R1/L1).

When the current value whereat the transistor is turned on is denoted by Ion and the current value whereat the transistor is turned off is denoted by Ioff, the time Ton, during which the transistor is ON, and the time Toff, during which the transistor is OFF, are represented by $$Ton = (Ion - Ioff)/\alpha 1 \qquad \text{Equation 11}$$

$$Toff = (Ioff - Ion)/\alpha 2 \qquad \text{Equation 12}$$

These represent relationships existing after the constant current value has been obtained, and the transistor has been remained in the ON state until the constant current value has been reached.

When the current instruction value is denoted by I1, the ON time Ton1 is represented by $$Ton1 = I1/\alpha 1 \qquad \text{Equation 13}$$

The time Toff1, from the constant current value to the current 0 A, is represented by $$Toff1 = I1/\alpha 2 \qquad \text{Equation 14}$$

The ON/OFF time for the transistor provided using these equations can be employed as the reference waveform.

Of course, the ON/OFF waveform of the transistor may actually be measured for use as the reference waveform.

Figure 10:
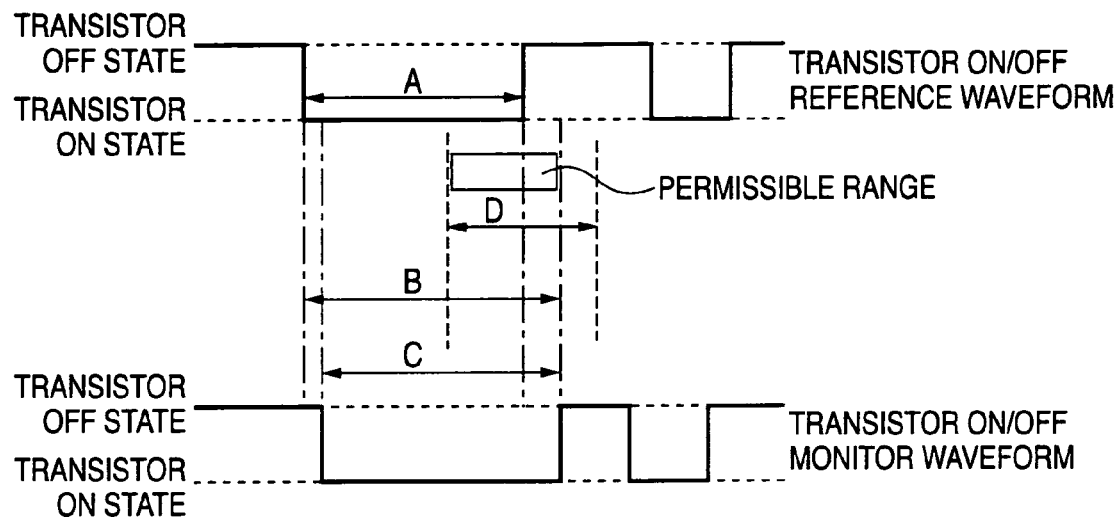
FIG. 10 is a diagram showing the generation of the ON/OFF waveform of the transistor.
Figure 11:
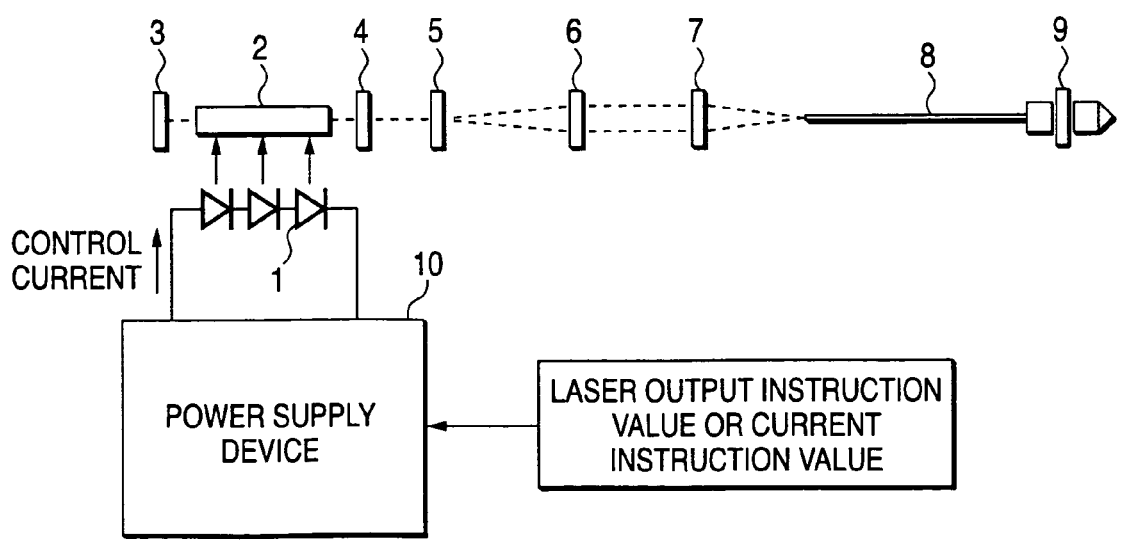
FIG. 11 is a schematic diagram showing the configuration of a conventional laser oscillator.
Figure 12:
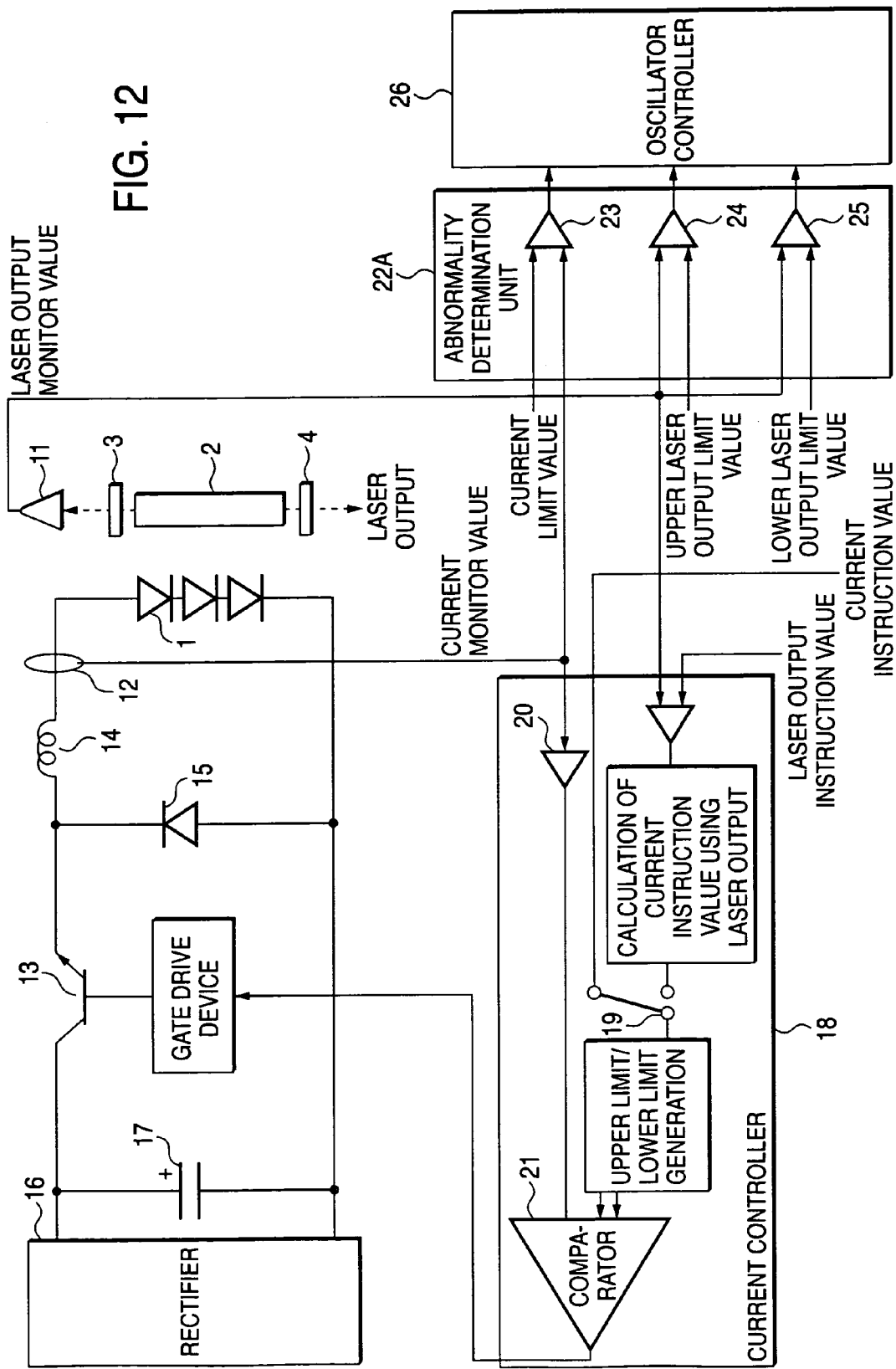
FIG. 12 is a diagram showing a specific internal example for a power supply device 10.

Based on the reference waveform, as shown in FIG. 10 the interval (B in FIG. 10) from the ON time state for the reference waveform to the OFF time state for the monitor value is measured to determine whether the interval falls within the permissible range (D in FIG. 10) for the OFF time for the reference waveform.

Either this, or the interval (C in FIG. 10) between the ON time and the OFF time for the monitor value is measured and is compared with the interval (A in FIG. 15) between the ON time and the OFF time for the reference waveform to determine whether the interval falls within the permissible range.

The interval between the ON and OFF time states in one cycle has been employed for the determination. However, the interval between the ON time states or the interval for one cycle or more may be employed for the determination.

Based on the above determination results, an error signal is output to the oscillator controller 26.

With this configuration, since it can be confirmed that in accordance with the ON/OFF signal the transistor is operated normally, it can be determined upon the occurrence of a current waveform abnormality whether the control signal (e.g., the ON/OFF signal for the transistor) is abnormal, or whether, even though the control signal is normal, the characteristic of the reactor or the laser diode that determines the current waveform is abnormal.

That is, upon the occurrence of a laser output abnormality, it can be determined that the abnormality has occurred either at the light amplification portion or the power supply portion, and in addition, for a power supply abnormality, the location of the failure can be precisely identified.

As is described in detail, according to the present invention, since a shifting of the monitor value from the reference waveform can be detected, upon the occurrence of a laser output abnormality it can be surely determined that an abnormality has occurred either at the light amplification portion or at the power supply portion. As a result, the location of the failure can be easily identified.

INDUSTRIAL APPLICABILITY

As is described above, according to the invention, since a failure of the laser oscillator can be detected, the location of a failure can be easily identified. Thus, the laser oscillator according to the invention is appropriate means for improving the operational efficiency.

The invention claimed is:

1. A laser oscillator that, in accordance with a laser output instruction value or a current instruction value that is input, excites a laser medium and obtains a desired laser output comprising:
   reference waveform generation unit for employing said laser output instruction value or said current instruction value to generate a laser output waveform and a current waveform, which are references;
   a first comparison unit for obtaining a current monitor value, used to excite said laser medium, and for comparing said current monitor value with said current waveform generated by said reference waveform generation unit; and
   a second comparison unit for fetching a laser output monitor value, output by exciting said laser medium, and for comparing said value for said laser with said laser output waveform generated by said reference waveform generation unit,
   wherein an abnormality is detected.

2. The laser oscillator according to claim 1, further comprising:
   a third comparison unit for fetching an ON/OFF signal for a main circuit device for controlling a current that flows across a laser diode that excites said laser medium or a monitor signal for said main circuit device, and for comparing said ON/OFF signal with an ON/OFF signal for said main circuit device that is generated by said reference waveform generation unit based on said laser output instruction value or said current instruction value.

3. The laser oscillator according to claim 1, wherein a predetermined permissible range is set for a reference waveform for the comparison performed by said comparison unit.

4. The laser oscillator according to claim 1, wherein the current waveform is generated using the following equations:

$$I = \alpha \times t \text{ when } 0 \leq t \leq (I1/\alpha)$$

$$I = I1 \text{ when } (I1/\alpha) \leq t$$

where $\alpha$ is a constant value, I1 is the current instruction value, and t is time required for the current value to attain a desired value.

5. The laser oscillator according to claim 1, wherein said laser output waveform is generated using the following equations:

$$P = \beta \times (\alpha \times t - \gamma) \text{ when } 0 \leq t \leq (I1/\alpha)$$

$$P = \beta \times (I1 - \gamma) \text{ when } (I1/\alpha) \leq t$$

where $\alpha$ is a constant value, $\beta$ denotes a proportional constant, $\gamma$ denotes a threshold current, and I1 is the laser output instruction value.

6. The laser oscillator according to claim 1, wherein at least one of said laser current waveform and said laser output waveform is generated based on a stepped approximation of an actual current waveform.

7. The laser oscillator according to claim 1, further comprising a current controller receiving at least one of the laser output instruction value and the current instruction value and driving a laser diode and wherein said at least one of the laser output instruction value and the current instruction value are input into the reference waveform generation unit.

8. The laser oscillator according to claim 7, wherein when the abnormality is detected by at least one of the first and the second comparison unit, an error signal is output by the at least one of the first and the second comparison units to an oscillator controller.

9. The laser oscillator according to claim 2, wherein the third comparison unit fetches the ON/OFF signal output by a transistor that turns ON/OFF current supplied to the laser diode.

10. The laser oscillator according to claim 3, wherein the permissible range is determined based on a variance in inclination of a current due to a variance in characteristics of the reactor and a laser diode, parallel shifting of the current value due to offset shifting of a current sensor, and variances in maximum current value and minimum current value produced by turning on and off a transistor.

11. A method for detecting whether an abnormality has occurred in a laser beam amplification portion or a power source portion of a laser oscillator, the method comprising:
   inputting at least one of a current instruction value and a laser output instruction value;
   transmitting the at least one of the current instruction value and the laser output instruction value to a power supply unit that supplies current to a laser diode of the laser oscillator;
   transmitting the at least one of the current instruction value and the laser output instruction value to an abnormality detection unit;
   generating by the abnormality detection unit a reference waveform using one of the current instruction value and the laser output instruction value;
   receiving at least one of a current monitoring value from a sensor monitoring current from the laser diode and a laser output monitoring value detected from a laser medium excited by the laser diode;
   comparing each of the received at least one of the current monitoring value and the laser output monitoring value with a respective generated reference waveform; and
   outputting an error message indicating that the abnormality has occurred in the laser beam amplification portion or the power source portion of the laser oscillator based on the comparison.

12. The method according to claim 11, further comprising setting a permissible range for each of the generated reference waveform and wherein said comparison comprises determining whether each of the received at least one of the current monitoring value and the laser output monitoring value has been shifted out the set permissible range of the respective generated reference waveform, and wherein, when said comparison determines that a received value of the received at least one of the current monitoring value and the laser output monitoring value has been shifted out the set permissible range of the respective generated reference waveform, said outputting operation is performed.

* * * * *